United States Patent [19]

Kanter

[11] Patent Number: 5,537,314

[45] Date of Patent: Jul. 16, 1996

[54] REFERRAL RECOGNITION SYSTEM FOR AN INCENTIVE AWARD PROGRAM

[75] Inventor: Mark W. Kanter, Lyndhurst, N.J.

[73] Assignee: First Marketrust Intl., Lyndhurst, N.J.

[21] Appl. No.: 393,508

[22] Filed: Feb. 23, 1995

Related U.S. Application Data

[63] Continuation of Ser. No. 229,390, Apr. 18, 1994, abandoned.

[51] Int. Cl.$^6$ .................................................. G06F 157/00
[52] U.S. Cl. ................................................................ 364/406
[58] Field of Search .................................. 364/401, 404, 364/405, 406

[56] References Cited

U.S. PATENT DOCUMENTS

| | | |
|---|---|---|
| 4,949,256 | 8/1990 | Humble . |
| 5,025,372 | 6/1991 | Burton et al. . |
| 5,202,826 | 4/1993 | McCarthy . |

OTHER PUBLICATIONS

"The New Bonanza for Credit Card Users/What Credit Cards Offer" Fortune Apr. 5, 1993 p. 10 by Alison Rogers. "Dreams and Down Lines" The Atlantic Monthly Oct. 1987 pp. 84–90 by David Owen.

Primary Examiner—Donald E. McElheny, Jr.

[57] ABSTRACT

A credit accumulation and accessing system for a plurality of sponsoring companies and participants having at each sponsoring company location (14, 16), a common bus (26), which communicates with participant data input (28), performance data input (34), computer processing (24), memory (30), an award output device (36), and an input/output device (32). Input/output device (32) may connect to a central control center (12), and/or a plurality of second sponsoring companies (14, 16), and/or a plurality of financial institutions (94), through communication lines (38). Sponsoring company, participant, and performance data, along with award conversion tables, pyramidal association tables, award applicable merchandise UPC codes, financial-institution-issued lines of credit and computer operational programming, are stored. Under control of the operational program several tasks are accomplished accordingly, including, creating subdirectories for a single participant account so as to selectively associate the single account subdirectories with multiple sponsoring company accounts and deciphering such accordingly at points of sale, calculating, posting, and/or issuing discounts, raffle entries, store-credit returns, points, cash values, bill values, in accordance with performance of participants (72, 74), while sending results immediately and/or periodically to appropriate destinations, which may include computer memory and/or bank accounts and/or plastic cards on behalf of participants, participant sponsors in a pyramidal-type structure, sponsoring companies, sponsoring companies' sponsors in a pyramidal-type structure, raffle sponsors, and redeemed at appropriate locations which may include, sponsoring company, participant, beneficiary, or financial institution bank accounts (52, 54, 82, 84, 94), sponsoring company locations (14, 16), designated sponsoring company award output devices (36), participants' households, beneficiaries' locations, and cash dispensing machines, and received in the appropriate forms, which may include, designated sponsoring company merchandise, wire transfer, check, cash, coupon, certificate, charge card balance reductions, travel tour, or catalog merchandise.

20 Claims, 1 Drawing Sheet

REFERRAL RECOGNITION SYSTEM FOR AN INCENTIVE AWARD PROGRAM

This is a file-wrapper-continuation of application Ser. No. 08/229,390, filed Apr. 18, 1994, now abandoned.

BACKGROUND

1. Field of the Invention

This invention relates generally to the field of retail marketing promotions, and in particular, to an exemplary credit accumulation and accessing system.

2. Description of Prior Art

Traditional methods of advertising have called for merchants making announcements through many media avenues. These avenues include television, radio, newspapers, magazines, celebrity endorsements and other similar endorsements. The announcements are often spoken as with radio, or written, as with the printing of coupons in newspapers. These methods are usually very expensive, very time consuming, and often have to be paid for by merchants in advance of, and without any guarantee of future sales. Air time and periodical space are often sold at a premium. Designing advertisements, doing research to define the exact target audience, and choosing where, when and how to place the advertisements are burdensome. This is sometimes so complicated and so demanding that additional employees or outside agencies are often hired to take care of such details. Celebrity endorsements require the need for having the right contacts or, if one does not have good contacts, hiring an expensive agency that does. The management of coupon collection, verification, shuffling, and redemption is nearly an administrative nightmare. Many printed coupons, are collected by consumers, often in quantities of hundreds or even thousands of small pieces of paper, and are often later presented to merchants for redemption. The merchants collect the coupons as they are presented, verify that the presented coupons are valid, honor the discounts, and later sort the coupons. Sorting the coupons is a very time consuming process and usually is performed at the end of the day so as not to delay consumers. Coupons issued by manufacturers or other third parties are compiled and then sent to their respective issuers, for redemption. In this case, merchants have the disadvantage of having to wait to receive full payment from the manufacturers or third-party-coupon issuers, for the goods that were sold earlier at a discount. Reimbursement can take weeks, even months, and such delays can have a detrimental effect on a merchant's cash flow. The merchant often buys goods from the manufacturer in advance, and has to sell them to recoup the investment and make a profit. The longer the delays are, the longer the merchant's turn around time on their investment is and the longer restocking ability is delayed. Consumers on the other hand, become confused with collecting so many coupons, that often times, they find that several coupons have been left at home, some time during shopping or checkout. Furthermore, the use of the coupon method creates massive paper waste. Many times, coupons are printed and never redeemed. The ones that are redeemed are not always recycled because of human disregard or inconvenience.

The collection and redemption portions of the coupon method mentioned above, can be made simpler by the use of Humble's U.S. Pat. No. 4,949,256 issued Aug. 14, 1990. However, the use of this patent requires the acquisition of costly, and substantially, space consuming, automated equipment. Furthermore, the use of the patent does little to reduce the paper waste inherent with the traditional coupon method.

Nearly all merchants' sale prices must increase dramatically to counter the expenses incurred by the use of any of the above mentioned promotional techniques. This causes the overall cost of living to increase, hurting the entire economy.

Another promotional technique used by merchants is network marketing, also known as Multi-Level Marketing, or MLM for short. With this method, to aid the sale of merchants' products, merchants typically hire independent contractors. These independent contractors are also hired to assist the solicitation of other independent contractors, known as "recruits," who aid in selling the merchants' products. Each independent contractor can buy products from a merchant and use the products themselves or sell the products to others. Each independent contractor can also recruit other independent contractors who inherit the same opportunities as the person recruiting them has. This means, the recruits can also purchase, use or sell the merchants' products and recruit other independent contractors. With MLM, an independent contractor earns money two ways, by selling to others, at a markup, the products they bought from the merchant, or by receiving a commission on their recruits' sales. When a sale is made by the recruit of an independent contractor, the independent contractor receives a commission. In this instance, the commission structure is considered to have gone through one level of sponsorship. Commissions can derive from more than one level of sponsorship, such as when the recruit of an independent contractor's recruit makes a sale. According to the structure, the independent contractor might earn a commission from that sale, considered to have gone through two levels of sponsorship. The industry has used various commission structures, some offering eight levels of sponsorship or more. All of the recruits included in an independent contractor's levels of sponsorship are regarded as the independent contractor's "downline." The industry has used various methods of determining an independent contractor's commission rate. This includes totaling the sales generated by an independent contractor's downline, and applying a commission rate based on that figure. Often, levels are set in which this rate increases as the independent contractor's downline-sales-volume increases.

Multi-Level Marketing previously has had many disadvantages. To adopt such a marketing plan typically requires a merchant to have a broad understanding of MLM. Since this information is not common knowledge, merchants often must hire an individual who is familiar with MLM. These individuals are few and far between, making it difficult for merchants to find them. This allows these individuals to charge extremely high fees, so much so that most small businesses can not afford their services. Those merchants that can afford the service often find that once the MLM plans are established for them, they are burdened with having to handle an enormous amount of paperwork. This paperwork includes designing, and printing enrollment forms, order forms, and catalogs, and then mailing them to potential participants. This also includes receiving and processing completed enrollment forms and order forms; and calculating, printing and then mailing commission checks to independent contractors. Merchants have been known to purchase computers to assist this process. Merchants are also often limited to including in their catalog, only easily shipped or stored products. This is because the independent contractors must often pay for merchandise shipping charges and store the merchandise on their own property until it is sold to others. Any product that is too bulky, or heavy, would not be cost effective for independent contractors to purchase. This is because the independent contractors would have little room for storing bulky merchandise, or with the added expense of shipping and possibly storage, there would be little, if any, room for markup on its future sales.

The independent contractors are often limited to shopping through a catalog in order to purchase the merchant's products. This has the disadvantage of an independent contractor often having to pay for shipping charges of the ordered goods. It also has the effect of causing the independent contractor frustration, as shipping often carries several problems. With shipping, the independent contractor has to wait for the merchandise to arrive. This can take days, weeks, or in some cases, even months, as the merchant may be out of stock of the selected merchandise. When the merchandise finally arrives, the independent contractor is often dissatisfied for one of several reasons. The merchandise might be damaged from shipping. It might be the wrong merchandise, as orders are often botched through improper communication. The merchandise might not be of anticipated quality, such as a dress that does not fit properly. In the likely event of this dissatisfaction, often the independent contractor must go through the ordeal of repackaging and shipping the merchandise back to the merchant. The merchant will then do one of several things. The merchant might refund the independent contractors' money, which leaves the independent contractor feeling as though the whole experience was a waste of time. In the event the merchandise was damaged in shipping, the merchant might ship the independent contractor replacement merchandise. This would force the independent contractor to wait even longer for the desired merchandise to arrive. The replacement merchandise could also become damaged through shipment. If a merchant issues the independent contractor a credit line equal to the amount of the original purchase which was returned, the independent contractor, is often forced to buy something else from the merchant's catalog. This poses several problems for the independent contractor. The independent contractor might not be interested in any other merchandise the merchant has to offer since the catalogs are often limited in variety, in which case the independent contractor must purchase something that is undesirable. The price of the supplemental merchandise might not be the same as the purchase price of the original merchandise. If the supplemental merchandise price is higher, the independent contractor must spend more of his/her money than he/she originally planned to spend. If the price of the supplemental merchandise is less, the independent contractor will have money, which is not gaining interest, tied up with the merchant for an extended period of time. In other words, the independent contractor will have his/her money held by the merchant until such time when it is used toward another purchase.

With MLM, independent contractors must often store merchandise on their premises. Merchandise is usually bought in advance from a merchant by an independent contractor, who, in turn, stores the merchandise and attempts to sell the merchandise to others. Many independent contractors have not had sales training, but participate in an MLM plan because they are tempted by the high profit potential this sort of self-employment offers. As a result of their lack of proper sales training, often times, much of the merchandise they stocked up on, can not be sold to others. Rather, it remains stored on the independent contractor's premises for an extended period of time. Eventually, to become rid of the unwanted merchandise, the independent contractor must often do one of a few undesirable things. He/she must either give the merchandise away, sell it at a greatly reduced price, use it themselves or throw it in the garbage. This has had the unsavory result of depleting an independent contractor's cash flow. It has also resulted in many independent contractors after a certain degree of exposure to the program, often becoming jaded with MLM, subsequently giving up self-employment with MLM forever, and discouraging others from participating in any MLM plan also. Catalogs of merchant's products or services have also been bought and given to, or sold to others by independent contractors. This can alleviate the need for an independent contractor to stock up on merchandise, but requires the independent contractor to purchase the catalogs. Often times, a shopper does not want to pay for a catalog, as they are not sure if there is anything in the catalog that they even want to buy. Independent contractors, on the other hand, do not want to give the catalogs out for free. When the independent contractor gives the catalog out for free, the independent contractor does not recoup the investment he/she made to acquire the catalog. This results in an independent contractor's cash flow becoming depleted. If the shopper does buy the catalog and then buys something from the catalog, the total cost of what was spent to acquire the merchandise is greater than the list price of the merchandise. Add on shipping costs that the purchaser must pay and the total cost to acquire the merchandise rises substantially. Usually, the resulting price is equal to, and often greater than, the price of comparable merchandise found in a retail store or especially a discount store. Shoppers become discouraged upon having to pay an often higher than retail price for the merchandise from the catalog and being subjected to the problems associated with shipping, as mentioned previously. This leads most shoppers to avoid purchasing through these catalogs. This in turn, results in minimal sales for the independent contractor, who again, after a certain degree of exposure to the program, often becomes jaded, gives up self-employment with MLM, and discourages others from participating in any MLM plan also.

Another method used by merchants to assist sales of their goods or services, has been the installation of incentive programs. Incentive companies have been hired in the past to install such programs. The incentive program usually entails a participant carrying a card or bearing an identification number. This card or identification number is used to keep track of a participant's transaction. With the program, participants present their cards or identification numbers when making purchases. This allows participants to accumulate credit in their respective accounts based upon various purchasing goals established by the merchant. These goals can vary, but are mainly designed to increase a participant's spending with a merchant within certain time periods. Points have been awarded to participants according to their performance under the program's rules. The points are usually converted to dollar amounts according to a formula. The dollars are then used to purchase merchandise shown in the incentive companies catalog. The dollars could also be used to earn a paid trip for the participants and perhaps a certain number of family members to a vacation spot such as Hawaii or Florida. In some cases, at either the culmination of the program or a set period within the program, the points are converted to a direct cash payment. This payment is either handed to the participant, wired to the participant's bank account or charge card, or issued to the participant as a check, money order, certificate or coupon. It has also been issued to a separate account on a participant's charge card to be used only toward the purchase of a specific merchant's goods or services.

Computer programming and data processing have often been used to assist these incentive companies with managing the operations of the program. This includes printing, issuing and mailing reports to participants that show the credit issuing merchant's name on the statements. These statements also show participants' earned credit to date and approaching goals. This also has included printing and issuing to participants, charge cards that advertise the merchant and/or lending institution that sponsors the incentive program.

Incentive programs previously have had a number of drawbacks. There are several types of programs that allow for the issuance of merchandise, some of which also offer cash as awards. Originally there were only two methods for issuing merchandise. With one kind, an incentive company had its own warehousing facilities to store the merchandise. The incentive company bought merchandise from manufactures or distributors, and stocked its warehouses with the merchandise. The incentive company had catalogs prepared which showed the merchandise stocked by the incentive company. If a participant qualified for an award of merchandise, the participant was limited to merchandise shown in the catalog. The items of merchandise that could be ordered through the catalog depended on the amount of points achieved by the participant. Hence, a participant who earned more points under the incentive program could order more expensive merchandise, or more items of merchandise, than one who had a lesser accumulation of incentive points.

This warehousing had the disadvantage of tying up the incentive company's money in the inventory stockpile. This money was not drawing interest and was not being used while the inventory sat in the warehouse. Incentive companies could easily overestimate the amount of total achievement of the participants under the various incentive programs it was providing. In this case, the amount of merchandise ordered was less than expected, resulting in an overstocking of merchandise. This exacerbated the inventory drain, since the merchandise sat in the warehouse for even a longer time. In fact, because of such long duration of being stockpiled, some of the merchandise had to be sold on the general market in order to become rid of it.

If on the other hand the incentive company underestimated the total performance of participants in its incentive programs, then it was often understocked in the items of merchandise requested. This resulted in delayed shipment and delivery of the requested merchandise, causing the participant aggravation and dissatisfaction with the merchant and the incentive company. Moreover, since these later purchases often were not in bulk, or because prices increased, the cost to the incentive company usually escalated above initial costs.

There was another problem with such warehousing. In order to continually have merchandise readily available, the incentive companies often had to stock many of the same items year after year. The participants became bored with having the same old merchandise choices, or a selection with little variety. Accordingly, participants had little motivation to achieve an award in which they had little interest. Additionally, after the participants acquired a certain number of the merchandise items through prior programs, they had no use for more of the same when the merchandise was again offered later. With such a warehousing system, the incentive company was motivated to buy merchandise in bulk in order to get better cost breaks. Furthermore, in order to better move any one item of merchandise inventory better and to keep track of inventory more easily, the incentive companies were encouraged to limit the number of items available. This also lead to stocking the same old merchandise over long periods, which resulted in participants having the same boring choices over the years. This resulted in participants becoming jaded after a certain degree of exposure to the incentive programs.

Other disadvantages were that the incentive company had to properly maintain warehouse conditions, such as temperature and humidity, to preserve the merchandise, as well as take precautions to prevent fire or theft. Accommodations to receive the goods, stack or arrange them, as well as record their location, their entry and departure were also needed. Some incentive companies also found it desirable to maintain a number of warehouses throughout the country for better distribution.

Moreover, the warehousing system had problems associated with shipping merchandise by the incentive company to the participant. This included merchandise being damaged in transit, not only causing frustration to the participant, but necessitating the incentive company spending time and effort to package and ship merchandise once again to the participant. The system entailed the administrative procedures and additional cost of insuring merchandise not only during warehousing, but during its shipment.

With the other kind of merchandise system, the incentive company did not have its own warehouses. Rather it had contracts with suppliers or distributors of products to meet the obligations to participants. With this type of system, there were the aforesaid problems of goods damaged during shipment which lead to participant aggravation.

Moreover, because the supplier or distributor was spaced from the participant by an additional layer of communication, there often were delays in shipment and mistakes caused by miscommunications. Shipment delays resulted if the supplier or the distributor was understocked with the requested merchandise. With the supplier or distributor shipping the goods, there was a greater likelihood of there being a mistake in the exact goods that were to be shipped. It was furthermore necessary for the incentive company to maintain the additional relationship with the suppliers in order to properly effect a satisfactory program. Maintaining relationships, in this respect, was a disadvantage as compared to the warehousing system. With either the warehousing or the supplier merchandise system, the participants frequently paid higher prices than the price for the same merchandise offered by a public retailer and especially by a discount store. This had the unsavory result of the participant believing the dollar values assigned for the purchase points were inflated and illusory.

In some instances, the earned credits were spent by applying them toward paid trips, which also had drawbacks. One problem is that there was usually only one vacation spot to select from if the goal was met. In some cases, participants in one geographical area, such as in the eastern half of the US were awarded a trip to a spot in Florida, for example, while those in the western half of the US were awarded a vacation to a different place such as Hawaii. However, each participant was limited to choosing only one vacation spot. If the participants had been to the same area previously, in many instances they had little or no interest in returning once again. They additionally may have had no interest in the vacation spot for whatever reason, which might have included family limitations, pure lack of interest, or medical problems. There were also the inconveniences of travel arrangements and the psychological stress associated with traveling from a familiar environment to an unfamiliar one. These shortcomings all militated against motivating the participant to achieve.

Furthermore, when a participant redeemed an award, the merchant was responsible for reimbursing the incentive company for the cost of the award. This had the disadvantage of decreasing the merchant's cash flow and limited the amount of awards that the merchant could afford to issue.

Incentive plans have gone so far as to convert the points into dollars and then issue cash payments to the participants. Once the cash was paid, however, there was little to remind the participant of the merchant that issued it. There was also the problem of a participant having to carry cash on their person, often making the person more vulnerable to robbery and subsequently very uncomfortable. In the event of a robbery the stolen money was nearly impossible to trace and practically unrecoverable. Also if the cash was lost or misplaced, practically anybody who found it could claim it and the participant would have little recourse. Furthermore, since cash is widely accepted throughout the world, there was the added problem of the award often being spent outside the award issuing merchant's normal line of goods or services. Not only did this decrease a merchant's cash flow, but it did nothing to increase the sales of the merchant's products which subsequently, had to be further stored. This also resulted in allowing the merchant's competition to gain the award recipient's business, as the recipient might have spent the cash award wherever so desired.

Then there came another incentive program seen by Burton and Henke's joint U.S. Pat. No. 5,025,372, issued Jun. 18, 1991. This allowed an incentive company to use a system where consumers wishing to participate in the program could apply for a charge card from a program sponsoring lending institution. The charge cards when issued, would identify participants and would accumulate cash values to their cards based on the participants' performance under the incentive program. The awards could then be spent at any location that accepted the particular charge card. Statements bearing the names of the lending institution and the merchant who sponsored the incentive program would be sent to participants. These statements would show the participants the cash awards they have earned, how much they have used, and how much is available for use.

Burton and Henke's program has the disadvantage of limiting consumer participation to only those that are approved by the lending institution to receive a charge card. If the applicants are not approved, they must participate in the same manner and endure the same problems, as provided by incentive programs prior to Burton and Henke's joint patent. Approval of a charge card is a difficult feat for most individuals to accomplish. Many times an individual's credit report is the victim of human error. These reports are reviewed by lending institutions and any negative marks that appear are often the basis for the institution's rejection of an applicant's request for credit. The negative marks, if mistakenly applied, are usually unknown by the applicant. Often, the applicant is only made aware of the errors when he/she receives the lending institution's reason for denial. The applicant must then try to remove the marks and reapply. However, removing the marks is usually very difficult. Often times, negative marks can only be removed by way of a retraction letter from the business that reported the marks. Since the marks were mistakenly applied, the applicant must prove his/her innocence, which is extremely difficult as this goes against the US judicial system that states that an individual is presumed innocent until proven guilty. Often times the applicant can not remove the marks or gives up trying and is left with having increased difficulty in receiving a credit line from any lending institution in the future. Not only can negative marks appear by mistake, but many individuals at some point in their lifetime are met with some sort of financial crisis, such as the loss of a job. This often causes them to fall behind on their credit obligations. This causes negative marks to appear on the credit report and are next to impossible to have removed, thus scaring the applicant's credit report for life. Furthermore a lending institution often requires a credit applicant to have a certain amount of annual income, previous payment history, and other stringent requirements before being approved. Many individuals can not meet these requirements and are subsequently denied a credit line. This causes frustration for those that wish to participate in the program as designed but cannot because they do not have the lending institution's approval. Those individuals that are fortunate enough to be approved by the lending institution, as mentioned before, earn cash awards to their charge cards based on their performance. Since charge cards are accepted virtually worldwide, there is little to secure that the award issued to the recipient will be spent on the award issuing merchant's normal line of goods or services. Worse yet, it could be spent on goods or services provided by the merchant's competition. If the merchant's competition doesn't accept the charge card, the participant often can make an extra trip albeit risking accessing cash from a cash dispensing machine or other similar device. Returning with the cash, the participant can then spend the award with the merchant's competition. With the award being spent elsewhere, this again causes the merchants goods to remain unsold, requiring further storage. And, as stated before, once the award is issued, the merchant must reimburse the incentive company for the amount of the award. The merchant must also pay the incentive company and/or the lending institution a processing fee. This has the previously stated disadvantage of decreasing the merchant's cash flow and limiting the amount of awards the merchant could afford to issue. Furthermore, once the award was issued, there was often little in the award itself that reminded the recipient of the merchant who issued the award.

In addition, with Burton and Henke's joint patent, upon enrollment of a merchant's incentive program, participants could set aside a certain percentage of earned credits that are to be withheld. However, in order to change this percentage figure, a participant was required to call or write the incentive company that provided the program. This caused the participant frustration as time, effort and money had to be spent whenever a change in their withholding percentage was desired. This also necessitated the incentive company having to acquire and assign personnel to accept the call or letter from the participant, update the participant's account and send notice to the participant of the completed change.

Burton and Henke's joint patent also intended to appeal to lending institutions as these institutions are often looking to issue more credit cards to consumers. The idea was that participants of the program would be more likely to use the sponsoring institution's charge card than some other charge card they hold. This would hold true as participants would be using the sponsoring institutions' cards to redeem whatever performance credit had been stored there. Often times the performance credit available on a participant's charge card would be less than the total bill of a purchase, allowing the balance to be conveniently paid using the bank's credit line. However, the appeal to lending institutions was dismal in that, participants had to be approved by the banks in order to participate in the program. Without the lending institution's sponsorship, there was no new incentive program. The program relied on a lending institution's sponsorship. Lending institutions were also faced with the disadvantage of not being able to sponsor more than one merchant incentive program per card issued to consumers. In other words, if a consumer wished to participate in two different merchant's incentive programs, the consumer would need two charge cards; one for each merchant. Similarly, each additional merchant incentive program that a consumer wished to participate in required the consumer to apply for, and subsequently carry, an additional charge card. This would cause a lending institution to issue another card, credit line and monthly statement to a consumer for each merchant incentive program the consumer joins. Since the size of a consumer's wallet is usually limited, the amount of cards that a consumer can carry is limited. This means that a consumer, after joining several merchant incentive programs and having no more room in their wallet for additional cards, would be inclined to pass up other merchant incentive program offers. Realizing this limitation and since lending institutions usually extend only a limited amount of credit to any one individual, lending institutions would be inclined to sponsor only a limited amount of merchant incentive programs. This means that the amount of merchants that could install such an incentive program would also be limited. Many merchants cannot afford to be their own lending institutions. However, banks can, and subsequently this incentive program has been repeatedly used by banks to promote the use of their charge cards over other bank's charge cards. Since banks could use the incentive program on their own, they had little reason to assist other merchants in their incentive program needs. This left nearly all nonlending institution type merchant's without an improved incentive program to aid the sale of their goods or services.

Another incentive plan available is shown by McCarthy's U.S. Pat. No. 5,202,826, issued Apr. 13, 1993. With this system, participants of the incentive program accumulate cash rebates in a holding account at a central center. The rebates are often based upon multiplying a merchant's predesignated or keyed in discount rate by a participant's purchase amount. Consumers can participate in multiple merchant incentive programs with the need for only one identification code number. All of a consumers cash awards earned from multiple merchants' programs accumulate in one account for the consumer. The accumulated amount is then issued to the consumer at certain time periods, such as the consumer's birthday. This program has the disadvantage of a participant having to make an extra trip to a cash dispensing machine or other similar device or having to have a checking account in which money could be transferred to, in order to receive their awards. This also has the disadvantage of a participant having to wait until the end of certain periods within the program before being able to access their awards. Furthermore, this program has problems similar to Burton and Henke's joint patent. Again, when the award is paid, there is little to remind the participant of the merchant that issued the award. The merchant must reimburse the incentive company for issuing the award, which reduces the merchant's cash flow. It is usually reduced even further by the added payment of a processing fee to a cash dispensing company or other similar financial broker. The reduced cash flow limits the amount of awards the merchant could afford to issue. With the participant receiving cash as an award, the participant again faced the aforementioned problems of often becoming more vulnerable to robbery, subsequently feeling very uncomfortable, and having difficulty recovering stolen or lost cash. By issuing cash, the merchant also faced the previously stated problems of a recipient being able to spend the award with the merchant's competition, causing the merchant's own goods to remain unsold, requiring further storage. If a participant is issued a check instead of accessing the award from a cash dispensing machine, or other similar device, there are several disadvantages. The incentive company has to spend additional time and money to write and mail the check to the participant. This also causes delays before a participant can receive their award, as the participant must wait for the company to write the check, mail it, and then wait for the post office to deliver it. Postal delivery normally takes two to three working days, but possibly even longer. Sometimes delivery never occurs at all, as mail is often lost in transit and at that point, an inquiry would have to be made by the participant in order for a replacement check to be sent. This would create even further delays before the participant could receive their award. If and when the check finally arrives it must be brought to a bank or other similar check clearing institution, for redemption by the participant, which takes even more time. If the participant does not have a bank account, the check would have to be cashed at the bank it is drawn upon. Often times these banks are quite a distance, often out of state, from the participant's home. This requires the participant to travel a great distance to receive the award, which, after time and money are spent on traveling, might not be worth the trip. If the participant does have a bank account, but the balance in the account is not greater than the amount of the check, the check must be deposited. This often requires the use of a deposit slip. This creates paper waste. The check can then be withdrawn upon only after it clears. Check clearing often takes several days and in some cases, especially with new accounts, up to a month. This causes further delays before a recipient can receive their award. Depositing the check often requires the participant to take the time to fill out a deposit slip. It also subjects the participant to the possibility of the check not clearing and the participant being charged a penalty fee. If and when the check clears, in order to finally receive the award, the participant is usually required to make another trip to the bank. There, he/she must often fill out a withdrawal slip, which takes more time and wastes more paper. However, instead of using a withdrawal slip, a check could be written against the account. This might save the participant a trip to the bank, but causes more paper waste and usually costs the participant a check clearing fee. If the participant's bank account balance is greater than the amount of the check, then the participant can receive the award without further delays. However, the check itself creates additional paper waste. Additionally, participants are not able to access accumulated awards when making purchases. And, since consumers do not want to wait long periods and make extra trips to receive their awards, there is little motivation for the card to be presented when participants make purchases. The incentive program's appeal toward lending institutions, in this respect, was much less than that presented by Burton and Henke's joint patent.

Another incentive program on the market allows a participant to earn commissions on whatever he/she buys using a sponsoring lending institution's charge card. The commissions accumulate on the charge card and are good toward the purchase of an also sponsoring, merchant's goods or services. Charge cards are usually printed, advertising the names of the program sponsoring merchant and lending institution and then issued to participants. This program has the aforementioned problems of a participant having to qualify for a credit line from the sponsoring lending institution for every merchant the participant wishes to participate with. This also includes participant's having to wait until the end of certain time periods within the program before having access to their awards. It further includes participants running out of room in their wallet for extra cards and confusion created from having several charge cards and being limited to a budget, as will be described, and, as a result of such lack-of-wallet-room and undesired confusion, passing up other merchant incentive program opportunities. The program is also faced with having dismal appeal to lending institutions in that consumer appeal is decreased by reasons stated in the previous three sentences and there is still the problem of the lending institution having to issue multiple cards, credit lines, and statements to a single consumer who wishes to participate in multiple merchant incentive programs. Further problems include lending institutions limiting the amount of merchant incentive programs they will sponsor because the lending institution limits the amount of credit they will extend to a single individual. The incentive program furthermore has the disadvantage of having to rely on a lending institution's sponsorship which has the aforementioned problems of limiting program availability to only lending institution sponsored merchants.

Confusion would often occur to a consumer who participates in several merchant incentive programs. A consumer usually maintains a budget. So long as they stay within the budget's limit, they can comfortably spend money. Since consumers often wish to stay within their budget, they may have difficulty deciding which incentive charge card to use when making purchases. For example; Say a consumer has three separate incentive cards. When making a purchase that will be the last purchase that can be made which allows a participant to stay within their budget, what card should the participant use? Should a participant use card number one, which accumulates credit toward the purchase of gas? Should the participant use card number two, which accumulates credit toward the purchase of a car? Or, should the participant use card number three which accumulates credit toward the purchase of pizza? Moreover, should the participant wish to evenly split their budget among the three cards, problems will arise. Since various purchases often carry different totals, the participant will most likely lose track of which card has been used enough and which one has not. There are sure to be other similar problems relating to a participant having too many incentive cards. In time, as this trend continues, these problems should become evident. In addition, this incentive program emphasizes frequent use of the sponsoring lending institution's charge card toward every purchase with any merchant, more so than it emphasizes making purchases at the sponsoring merchant. Participants receive no greater award accumulation for making purchases with the sponsoring merchant than they do by making purchases with other merchants. Thus, this program has the unsavory result of allowing a participant to be rewarded for making purchases with the sponsoring merchant's competition. Furthermore, unless a participant used their incentive charge card for making purchases, the participant would have no added incentive for making purchases with the sponsoring merchant, since no awards would accumulate.

Another incentive program has been used by certain telecommunications service companies. This program allowed participants to earn discounts on phone calls they made to people they assisted in switching to the telecommunication companies' service. This program has mainly been limited in use by telecommunication service companies, since these companies can monitor to whom every customer's phone call is made in order to apply the appropriate discount, whereas most non-telecommunication companies do not offer a similar traceable type of service and obviously can not offer their customers such discounts. This program also does not lend its assistance to other merchants that wish to use the incentive program in conjunction with the telecommunication companies use of the program, which, in this respect, is a disadvantage when compared to traditional multi-level marketing companies. Likewise, a consumer can not participate in multiple telecommunication incentive programs while using one account number as identification for the lot. A unique account number is required for each company the consumer participates with. Subsequently, this program has dismal appeal to a lending institution's sponsorship as consumers again need to be issued multiple cards, credit lines and statements and availability of the program is mainly limited to telecommunication type merchants.

An additional feature brought about by the use of charge cards has been the ability to issue cash returns to a consumer account. However, when a merchant is to give store-credit-only for a consumer's return, the consumer must have a charge card that was issued for exclusive use with the merchant. If the consumer does not have this type of card, the merchant must often issue a paper credit voucher to the consumer. This takes time and also wastes paper. Further, the consumer must later present their credit voucher when making a future purchase in order to redeem their credit. Consumer's often lose these credit vouchers or realize they have forgotten to bring them some time during shopping or checkout. This causes the consumer's money to remain with the merchant for an even longer time, while not earning any interest. This often creates aggravation for the consumer. Many merchant's do not have the aid of a lending institution that issues charge cards to consumers for exclusive use with the merchant. This results in many merchants having to use the credit voucher method to issue store credit returns. Those merchants that are fortunate to have the backing of a lending institution still have problems. Their consumers must still gain approval of a credit line from the lending institution before they can receive a card. Considering the problems mentioned before of consumers having negative marks on their credit reports, having difficulty clearing them, and not meeting the lending institutions stringent demands, many consumers are not approved for a card. This means that merchants again, must resort to using the credit voucher method when making store credit returns to these individuals.

OBJECTS AND ADVANTAGES

Accordingly, several objects and advantages of my invention are:

(a) to provide an incentive program which can act as an advertising campaign and which is a convenient and an economical alternative to traditional advertising as no money is required up front and the burdens associated with coupon and ad designing, ad printing, target marketing and related aspects are eliminated;

(b) to provide an incentive program which can act as an advertising campaign for program sponsoring companies and which further reduces the need for coupon printing and collecting as participants can have rebates automatically applied to their accounts;

(c) to provide an incentive program which can act as an advertising campaign for a sponsoring company and which does not necessitate a sponsoring company's sale prices to increase to counter the campaign expenses, since commissions incur only when campaign generated sales are made;

(d) to provide a system wherein there is practically unlimited availability for sponsoring companies to conveniently and economically use a multi-level selling method and which does not require such sponsoring companies to have only easily shipped or stored products for sale through the system, and does not require such sponsoring companies to write, and mail checks, design, print, and ship catalogs, and which does not require such sponsoring companies to have any prior knowledge of multi-level marketing;

(e) to provide a system wherein a participant can join in a sponsoring company's multi-level selling campaign and earn money without having to stock up on goods in attempts to sell such goods, or purchase catalogs in attempts to sell the goods listed in the catalogs, and deal with related problems and expenses, such as with shipping;

(f) to provide a system wherein a participant can join in a merchant's multilevel selling campaign and/or incentive award program and redeem their earnings, and/or credit, and/or awards at the sponsoring company's location, as soon as the earnings, and/or credit and/or awards are posted, alleviating the need for check writing and mailing, and eliminating delays and other problems associated with such procedures;

(g) to provide an incentive award program which eliminates difficulties caused by incentive award programs heretofore;

(h) to provide an incentive award program which eliminates the need to warehouse catalog merchandise and the problems associated with acquiring such merchandise and shipping it to participants;

(i) to provide an incentive award program which eliminates the problems associated with buying merchandise from suppliers or manufacturers who ship the merchandise to participants;

(j) to provide an incentive award program that eliminates or minimizes problems associated with incentive programs which award vacation trips to participants;

(k) to provide an incentive award program which eliminates the problems associated with incentive programs which award cash, checks, coupons, or certificates to participants;

(l) to provide an incentive award program which brings the attention of participants to the sponsoring company generally by way of the participants' realization of awards being consumption of the sponsoring company's regular line of goods or services;

(m) to provide an incentive award program which eliminates the need for applicants to be approved by a lending institution in order to participate in the program;

(n) to provide an incentive award program wherein sponsoring companies can control the fact that awards issued to a participant by that sponsoring company are spent only with that sponsoring company or optionally at designated locations;

(o) to provide an incentive award program wherein sponsoring companies do not award participants for making purchases with companies other than their own, unless the sponsoring company so desires;

(p) to provide an incentive award program which does not decrease the cash flow of a sponsoring company who honors awards;

(q) to provide an incentive award program wherein participants can conveniently designate their withholding award amounts, possibly overriding predesignated figures, with each sale, and wherein additional personnel is not needed to manage such changes;

(r) to provide an incentive award program wherein sponsoring companies can conveniently designate award issuance amounts, possibly overriding predesignated figures, with each participant sale and wherein additional personnel is not needed to manage such changes;

(s) to provide an incentive award program which does not rely on a financial institution's sponsorship;

(t) to provide an incentive award program which allows a participant to carry just one account number or card in order to participate in multiple sponsoring company programs;

(u) to provide an incentive award program which is attractive, more so than prior programs, to financial institutions who desire to issue credit lines, in that, eliminated, is the need for issuance of multiple cards, credit lines and statements to an individual that participates in multiple sponsoring company programs, and increased is the appeal toward individual participation;

(v) to provide an incentive award program which does not limit its availability to less than the total amount of companies desiring to use the program, as did prior incentive programs on account of:

lack of ability to offer an incentive, wherein discounts apply on calls placed to certain individuals by those that recruited the individuals, for any company that is not a telecommunication service distributor, as obviously, such companies do not sell telecommunication services; and/or lack of financial institution sponsorship; and/or lack of applicant approval of a credit line from a sponsoring financial institution; and/or lack of appeal for individual participation as:
      awards were not accessible when making sales and/or
      extra trips had to be made for the participant to receive the award, and/or
      awards were not immediately issued when earned, and/or
      multiple charge cards would have to be carried for multiple merchant participation, with budget limitations causing confusion as awards only accumulated for a participant when that participant made a sale and/or
      other related participant difficulties listed in prior art section;

(w) to provide an incentive award program which does not require a sponsoring company and/or participant to pay a lending institution a processing fee for award redemption, thus this does not limit the amount of award a sponsoring company wishes to issue to participants and/or does not cause participants to feel as if the awards they receive are unjustly discounted;

(x) to provide an incentive award program which allows participants to receive award payments in the form of a sponsoring company's own goods or services, thereby moving the sponsoring company's merchandise, rather than decreasing their cash flow, upon payment of awards;

(y) to provide an incentive award program which has greater appeal than prior programs for participation of individuals as participants do not need to make sales to accumulate awards;

(z) to provide an incentive program which allows a sponsoring company to use a voucherless store credit rebate system without the need for a financial institution's issuance of exclusive use charge cards to participants;

(aa) to provide a system wherein an incentive award program can be integrated for use with return credit account storage for a participant with or without an approved credit line from a financial institution; financial institution issuance of credit may also be integrated along with the alternatives of catalog merchandise, travel tour, cash, check, coupon, or certificate selection of awards;

(bb) to provide an incentive award program which can motivate participants to make referrals on behalf of the program and/or sponsors of the program;

(cc) to provide an incentive award program which can motivate participants to make purchases from sponsors of the program, rather than with the competition of such sponsors;

(dd) to provide an incentive award program that allows ease in administration by sponsors of the program;

(ee) to provide an incentive program that can have individually selected rules for each of a multiple of sponsoring companies;

(ff) to provide an incentive program which, while increasing a sponsoring company's business, allows a participant to earn unlimited savings, possibly 100% off future purchases with that sponsoring company;

(gg) to provide an incentive program which also allows a sponsoring financial institution to issue to participants, rebates that can be applied to their charge card for use in reducing the account balance or making any purchase, or which can be redeemed in cash, coupons, checks, catalog products, trips, goods or service from designated merchants, or any combination thereof;

(hh) to provide an incentive program which allows a participant to use the same membership card in conjunction with Humble's Coupon Validation Network, U.S. Pat. No. 4,949,256 issued Aug. 14, 1990;

(ii) to provide an incentive program which allows a sponsoring company to designate certain items of merchandise or certain services as valid or invalid toward posting awards and/or as valid or invalid for redemption of awards;

(jj) to provide an incentive program which allows sponsorship by a telecommunication network company where a calling card number can be placed on the membership card for a participant to use;

(kk) to provide an incentive program which allows a participant to be entered into a sweepstakes drawing and/or other raffle of any sort held independently by a sponsoring company or jointly with a plurality of sponsoring companies, or both, upon proper performance, such as by making a sale;

(ll) to provide an incentive program which allows a percentage of and/or a set amount for each sale made by a participant to be paid by the sponsoring company and/or other sponsoring companies of the program to a benefit, cause, or other fund for any purpose;

(mm) to provide an incentive program which allows a sponsoring company to limit the amount of earned awards that can be redeemed by a participant with any sale and/or within certain time frames;

(nn) to provide an incentive program which allows a sponsoring company to limit the amount of awards posted on any sale;

(oo) to provide an incentive program which allows a participant to conveniently determine their award balance at any sponsoring company they participate with by the aid of a phone call, swipe of their card at a sponsoring company's location or receipt of a monthly statement;

These and further objects and advantages will become apparent from a consideration of the drawings and ensuing description.

BRIEF DESCRIPTION OF THE DRAWING

An embodiment of the invention is shown in the drawings, with preferred manners described in the detailed description below, it being understood, however, that the invention is not limited to the precise arrangements and instrumentalities shown and/or described.

REFERENCE NUMERALS IN DRAWINGS

Figure 1:
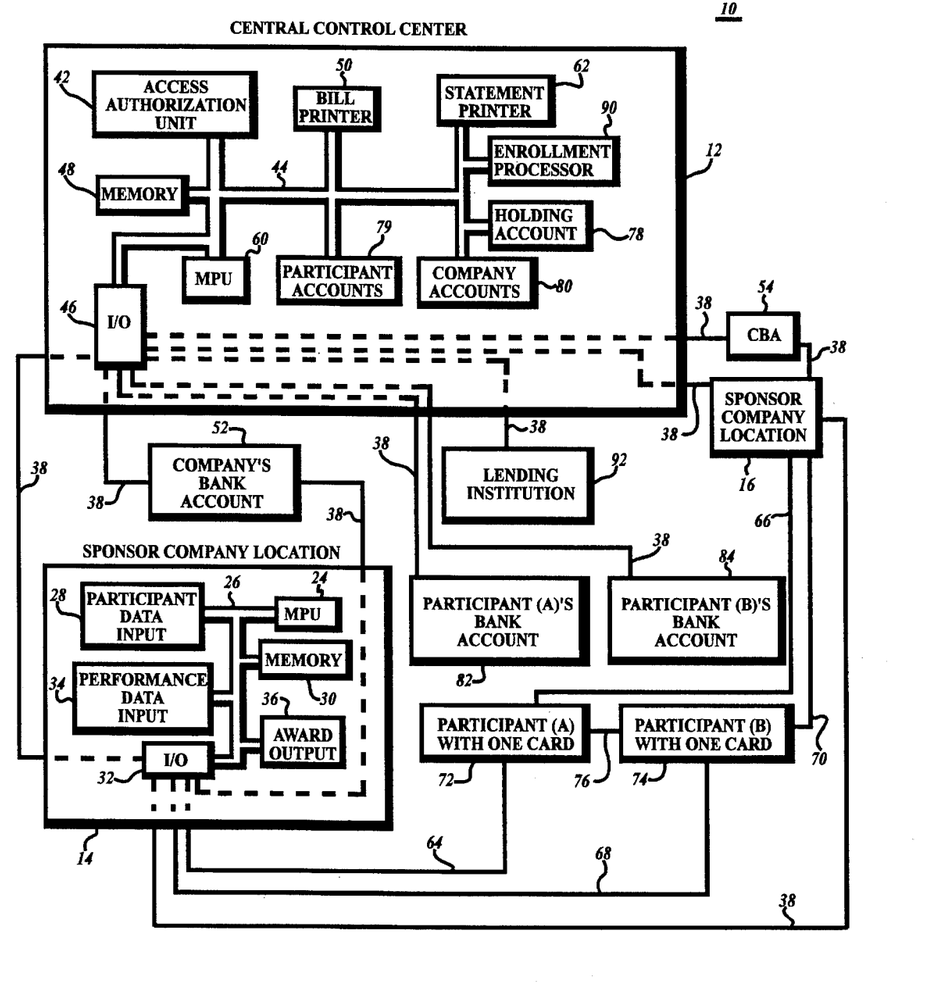
The FIGURE is a block diagram of a system wherein a participant, with one account number or card, can realize multi-level credit and/or awards at multiple sponsoring companies accordingly, which coincides with this invention.

| | |
|---|---|
| 10 general designation of invention | 12 central control center |
| 14 sponsoring company location | 16 sponsoring company location |
| 22 financial institution | 24 computer processing unit at 14, 16 |
| 26 common bus at 14 | 28 participant data input device |
| 30 sponsoring company's memory device | 32 input/output device at 14 |
| 34 performance data input device | 36 award output device |
| 38 communication lines | 42 access authorization unit |
| 44 common bus at 12 | 46 input/output device at 12 |
| 48 memory at 12 | 50 bill printer |
| 52 bank account of company 14 | 54 bank account of company 16 |
| 60 computer processing unit at 12 | 62 statement printer |
| 64 participant (A) path to 14 | 66 participant (A) path to 16 |
| 68 participant (B) path to 14 | 70 participant (B) path to 16 |
| 72 participant (A) with one card | 74 participant (B) with one card |
| 76 communication line between 72 and 74 | 78 holding account |
| 79 participant accounts memory | 80 sponsoring company accounts memory |
| 82 bank account of 72 | 84 bank account of 74 |
| 90 enrollment processor | 92 financial institution |

SUMMARY OF THE INVENTION

Disclosed is a system which generally contains all the aspects listed within this paragraph but in no way should be deemed as being limited to such content. As designed, a participant with one card, realizes multi-level credit and/or awards at multiple sponsoring companies accordingly. Sponsoring companies can independently designate credit and/or award structures and issue such to participants preferably at their times of purchases by making deductions in the purchase prices accordingly and/or by placing entries into raffles on behalf of the participants. Alternatively sponsoring companies can issue the awards to participants in the form of catalog merchandise, travel tour, cash, check, coupon, certificate or direct deposit into the participants' bank account. Sponsoring companies, without realizing any financial loss can also honor awards posted to participants' accounts by other sponsoring companies. Likewise, sponsoring companies can post credit and/or awards to participants' accounts and designate at which sponsoring company location(s) the credit and/or awards can be redeemed. Sponsoring companies can further designate which merchandise and/or service they offer can or can not be included in the redemption of, and/or in the calculation of credit and/or awards. A sponsoring company can hold their own raffles and/or allow their participants to enter other sponsoring companies' raffles with each sale. A sponsoring company can motivate participants to make referrals on behalf of the sponsoring company by issuing credit and/or awards to participants based on sales made by the people the participants refer to the sponsoring company; and possibly on sales made by the people such referred people refer; and possibly on sales made by people referred by the precedingly referred people, and so on. A sponsoring company can motivate company loyalty by awarding participants for making sales only at the sponsoring company's location and no where else, or optionally award participants for making sales at their location and/or other locations. Participants need only one card or account number to participate in multiple sponsoring company programs but can have more than one if so desired. Participants do not need financial institution approval to participate in the program which also allows return credit to be stored in their accounts. Participants can accumulate awards without having to make sales. Participants can receive up to 100% off sales, while the sponsoring company or companies making such sales receive(s) full payment. Participants can realize their credits and/or awards the instant they are earned. Participants can discover their available credit balances through receipt of a statement, swipe of their card through a transaction terminal, or placement of a phone call to an account balance hotline. Compared to prior art, there is considerably more appeal for financial institutions to sponsor the program, subsequently extending credit to participants.

DETAILED DESCRIPTION OF THE PREFERRED EMBODIMENT

Where a series of capitals are first shown they appear in parenthesis and denote the first letters of a series of words that immediately precede their location. When such series of capitals are mentioned thereafter, they stand alone and represent their original location's preceded words. This is used for brevity throughout the following description.

With reference to the FIGURE, there is shown a block diagram 10 of an exemplary system wherein a participant can realize multi-level conveyance, such as credit amounts and/or awards for example, with multiple program sponsoring companies accordingly, having a central system 12, a plurality of sponsoring company locations 14 and 16, in this case two although there could be more or fewer than two, having a plurality of participants 18 and 20, in this case, also only two, although there could be more or fewer than two, and having, as a third-party-credit issuer, one financial institution 22, although there can be more than one or none at all. A sponsoring company location 14 and/or 16, includes at least one computer unit 24 such as a microprocessor and associated peripherals which communicates, over a common bus 26, for example, with a participant data input device 28, a memory 30 and an input/output (I/O) device 32.

Participant data input device 28 is preferably located at a point-of-sale to a participant making a sale of merchandise and/or services from a selected sponsoring company. Device 28 may be a keyboard into which a participant or sponsoring company may enter the participant's account number. In a preferred embodiment, the participant's account number is a unique account number of the participant, such as the participant's social security number, and is encoded in a magnetic stripe or similar on a plastic card and presented to the sponsoring company who swipes the card through an electronic-magnetic-stripe-card-reading-and-writing device also taking the form of device 28. Device 28 might further serve to increase, or decrease a credit balance also appearing on the plastic card. Device 28 might also include a keyboard for entry of a participant's personal security number which can be used to verify against a code, stored in the magnetic stripe or memory 30 or memory at central control center 12, that the card is being used by the appropriate individual at the point-of-sale. Memory 30 may be a device such as a computer chip which has the ability for selectively storing information relating to a variety of accounts so as to allow other devices, as will be described, the reading ability of such stored information for example. I/O device 32 may be a modem, which can electronically receive, read and/or transmit account information for example.

Performance data input device 34 is also located at the point-of-sale and typically would be a keyboard or the like by which a sales clerk, for example, would enter the dollar amount of the merchandise or service sale made by the participant, if appropriate, any rebate or coupon values, and could deduct all, part, or none of a participant's earned credit from the total bill. Device 34 could be a cash register. Alternatively, device 28 and 34 could share a single keyboard.

Also located at the point-of-sale is award output device 36 and typically would be a receipt printer which may show the earned credit applied to a participant's sale. Alternatively, device 36 could be an electronic readout display or a combination receipt printer, readout display. Device 28, 34, and 36 could also be housed in one device.

The participant data and performance data entered through devices 28, 34 may be stored in memory 30. Memory 30 may also include sponsoring company data along with software to direct operation of computer 24 as will be described. The sponsoring company data includes at least a sponsoring company code number to identify that sponsoring company. Sponsoring company data may also include information including the time and/or location of the sale and/or the identification of the sales clerk, for example. Importantly, where the system is to provide an incentive based upon discounts offered by that sponsoring company, memory 30 also may include storage of variables such as a credit rate, a raffle-entry-conversion table (RECT), a point-conversion table (PCT) and a discount-rate-conversion table (DRCT) selected by that sponsoring company, which may be set into a work area in computer 24 by which cash value, and/or raffle entries and/or points are to be accumulated by the participant and/or the participant's sponsors in accordance with a sponsor-commission structure, as will be described. Memory 30 may also include storage of such accumulated point and/or credit balances and/or raffle entries accordingly. Memory 30 may further store bill values for third-party-credit issuers, such as a second sponsoring company. Credit amounts may be read from the participant's plastic card and deemed applicable toward a sale with the first sponsoring company. Bill values may increment according to credit amounts honored by the first sponsoring company on behalf of the second sponsoring company. The credit rate, RECT, PCT, DRCT for one sponsoring company are preferably selected by that sponsoring company and not by any other sponsoring company or center 12, in which case device 34 may contain a keyboard for which to input such selections. Memory 30 may also include storage of store credit balances for any returns made by participants. The return balances may be stored alternatively in the participant's plastic card. Alternatively, point, credit, and return balances, along with the bill values, credit rate, PCT, and DRCT information may be stored within center 12 but preferably, would be stored within memory 30. Bill values may be communicated to third parties such as through a communication line 38, which may be a telephone line.

As is well understood, computer 24 will function in accordance with the operating program stored in memory 30. To this end, computer 24 may verify that the participant's personal security number matches a code stored on the card, in memory 30, or within center 12, to verify that the user is authorized on that card. Computer 24 might also determine a credit value for the transaction based upon performance being a transaction and the credit rate being input, possibly overriding a predesignated credit rate, by a sales clerk at that time,, (e.g., sale of $100. and credit rate of 0.10=$10.), and separate and store this value, according to the sponsor-commission structure, in memory 30, or output the value, along with sponsoring company data, and participant data to center 12 through I/O device 32 and another communication line 38. Computer 24 might further determine a point value for the transaction based upon the transaction and the point-conversion table being input, possibly overriding a predesignated point-conversion table stored in memory 30, by the sponsoring company at that time, (e.g., $100. sale (point-conversion table: every $1. of purchase earns 1 point)=100 points) attach the date of the purchase with the determined point value and store this information in memory 30, or alternatively, output the value, sponsoring company data, and participant data to the central control center 12 through I/O device 32 and line 38. In addition, computer 24 might determine a discount value to apply to the participant's purchase based upon transaction data input, and the participant's point accumulation in accordance with the discount-rate-conversion table (e.g. $100. sale (DRCT: add points earned in past 30 days and if points are greater than 300, apply a 1% discount on current sale) assuming participant earned 500 points within past 30 days=$1. off) and send the transaction balance to award output device 36. Furthermore, computer 24 might determine a credit value to apply to the consumer's purchase based upon the transaction data input, the participant's available credit which may be stored in memory 30, on the participant's card, or at center 12 and possibly in accordance with the participant's request made into device 34 (e.g. $100. sale (assuming available credit is $50.) and participant requests to use half of available credit=$25.) and then send the transaction balance to award output device 36. Additionally, computer 24 might communicate with at least a second sponsoring company memory through another communication line 38, and credit values stored with the second sponsoring company memory on behalf of the participant and the first sponsoring company, may be transferred to the first sponsoring company and applied toward the participant's sale accordingly. Likewise, previously stored return values can be applied to participant sales in the same manner that available credit values are applied. However, return credit would first be stored in memory 30, or alternatively within center 12 as could occur when a participant returns merchandise presenting his/her account number and the sponsoring company enters the amount of money to be credited to the participant's account into device 34. The participant could realize any award or return credit by paying only the transaction balance displayed, and/or printed through device 36 when making any sale.

Computer 24 could also, on behalf of at least one beneficiary, determine a benefit value based upon performance, such as a participant sale, and a benefit-percentage rate, which may be stored in and retrieved from center 12, but preferably stored in and retrieved from memory 30 (e.g. $100. sale and benefit percentage rate of 0.20=$2.) and store the determined value in memory 30 or alternatively output the value and related sponsoring company data to center 12 through I/O device 32 and another communication line 38. Alternatively, a set monetary amount for each registered performance, regardless of the amount of a sale, could be added to a balance stored in memory 30 or alternatively output along with sponsoring company and beneficiary data to center 12 through I/O device 32 and line 38. Where information is stored in memory 30 it can then be accessed through local bus 26, by award output device 36, or by access authorization unit device 42 through local bus 44, I/O device 46, and through I/O device 32 and line 38. Such values could be stored in and read from memory 48 located at center 12. The values may be read from memory 48 and cause a bill to be printed through bill printer device 50. Preferably, the values are read by device 36, which creates the bill, which is to be paid by the appropriate donator(s) to the appropriate beneficiary(s). The bill could then be sent to the appropriate donator(s), such as by mail, for payment to the appropriate beneficiary(s). Preferably the bill could be electronically withdrawn by device 36, through bus 26, I/O 32, and line 38, or alternatively by device 50 from donator's(s') bank account 52, or 54 through bus 44, I/O 46, and lines 38, as shown in the FIGURE if merchant 14 and 16 were the donators, and sent to the beneficiary's bank account similarly. Additionally each sale made by a participant can register that participant into a sweepstakes drawing or other similar raffle. The entry into the drawing may be based upon a participant making a minimum purchase for example, as memory 30 or memory 48 would store such minimum purchase requirements. Computer 60 may determine if the appropriate sale amount was met and, if so, send a command through bus 44 to statement printer 62, which may print up an entry form on behalf of the participant, which could then be placed into the appropriate drawing. Computer 24 may determine if the required purchase amount was met and send a command through bus 26, I/O 32, line 38, I/O 46, bus 44 to printer 62 and print an entry form on behalf of the participant, which can be put into the raffle and/or, when the minimum amount is met, send a command through bus 26 to device 36 which can also print an entry form on behalf of the participant to be put into the raffle, thus allowing a sponsoring company to hold raffles independent of, or in conjunction with, a central-location-operated, and/or joint-participation, raffle. It is understood that entry forms could alternatively be code numbers stored in memory 30 and/or 48 from which a winner could be randomly chosen.

Center 12 may communicate with line 38 through its own I/O device 46. I/O devices 32 and 46 may be modems for example. Further, each sponsoring company location 14, 16 may communicate with center 12 and/or at least a second sponsoring company location either separately through I/O device 46 and/or 32 or collectively through multiple I/O devices 46 and/or 32 (only one of each shown) as is well understood.

Individuals, through paths 64, 66, 68, and 70 can become participants 72 and 74 and each need only one account number. Paths 64, 66, 68, and 70 could be routes that individuals can take to become participants, such as by walking to the sponsoring company locations, filling out enrollment forms and mailing them to the sponsoring company or shopping there for example. However, participants can have more than one card or account number if so desired. Participant 72 for example, can frequent location 14 and become a member, while obtaining a unique account number designating his/her membership at location 14. Participant 72 can then become a member of location 16 using the same account number, or if he/she so desires, can obtain a different account number for that location. Likewise, participant 72 can join other sponsoring company programs, obtaining different account numbers for each, or using a certain account number to designate participation at any number of sponsoring company programs. This is so as each participant can have an account number on his/her possession, but which is read by device 28 as being preceded by, yet being in connection with, the account number of the sponsoring company that the participant is making a sale at. Since each sponsoring company location will have a unique account number, theoretically, participant 72 would subsequently have a separate account number established for each sponsoring company location that he/she is a member.

Participant 72 can become a member of location 14 and can then tell other individuals through communication line 76 about location 14. Line 76 could allow for verbal communication or literature hand outs or any other form of communication that one person could use to reach another. Preferably the communication would be primarily in the form of an enrollment form which explains the sponsoring company rules and which participant 72 can attach his/her account number to before passing on to any other person such as participant 74, for example. Participant 74, upon joining the program at location 14, could then easily forward the account number of participant 72 to location 14, which could be entered into device 28, instantly activating participant 74 as the sponsor of participant 72. If any person that participant 72 tells about location 14 becomes a member, such as participant 74, of the program at location 14, in accordance with the program rules established at location 14, participant 72 can earn commissions on sales made by those members with location 14. Likewise, if participant 74 then tells other people about location 14 and those people become members and make sales with merchant 14, then participant 74 could earn a commission on those sales, and if the commission structure so designates, participant 72 might also earn a commission on those sales. This pyramid type progression can continue with participant 72 and 74 also earning commissions on sales made by other recruited members at location 14. In addition, participant 74 could become a member at location 16 and recruit participant 72 to location 16. Participant 74 could then earn commissions on sales made by participant 72 with location 16 accordingly. Thus, the pyramid structure of participant recruitment may be altered with each sponsoring company a participant becomes a member with. The levels a participant may earn commissions from and the percentages associated with each level are variable according to each sponsoring company's desires. Commissions may also be based upon total-sales-volume accumulation within certain time frames of participant sales from a designated number of recruitment levels, and a percentage which might increase as certain of such sale-dollar values are reached. For example, a participant might earn a 1% commission for a $500. total sales volume of recruits' sales three levels deep within a 30 day period; or alternatively earn 2% for a $1000. volume, four levels deep in 30 days. Furthermore, commissions can be made available to participants immediately, or held in a holding account memory 78, or in a similar account in memory 30, until such time as the sponsoring company desires to release the commission amounts. Such commission values, and accordingly, any return credit amounts, or points may be stored in memory 48 or in participant accounts memory 79, but preferably would be stored in memory 30, and each consumer account would have record of earned credit, points or returned credit that is being stored in relation to participant account numbers, security numbers, and in relation to sponsoring companies, and other participants also being preferably stored in memory 30 accordingly. A sponsoring company may be billed for pending commission amounts at each point-of-sale purchase made by a participant at their location. The amount may be electronically debited from the sponsoring company's appropriate bank account ,52, 54 through line 38, I/O 46, bus 44 and stored in memory 78 until at least such time as the appropriate cash return policy of the purchase has expired, so as to insure that the commission will be available when the appropriate participant(s) attempt(s) to redeem the commission.

Commission redemption, as stated before, may occur when a participant, having credit available, makes a sale with the appropriate sponsoring company and receives a discount off of the sale accordingly. This redemption can further be controlled by minimum-purchase requirements or by maximum-award allowances per sale or within certain time periods as may be established by each sponsoring company and stored in memory 48 or 30. Computer unit 24 or 60 will check memory 48 or 30 with each participant purchase and either allow, limit or disallow available award issuance as designed. This redemption can further be controlled in so far as a sponsoring company can designate where the commissions that have been posted can be redeemed to avoid awards being spent at undesirable locations or to allow awards to be spent wherever. For example, a participant 72, might earn commissions for purchases made at location 14, however, location 14 might collaborate with location 16 or any number of other sponsoring companies and allow participant 72 to redeem the commissions at location 16 or 14 or any number of other sponsoring companies. When a participant makes a sale using earned credit that has already been sent to center 12 and held in memory 78, computer 60 may electronically transfer, through bus 44, I/O 46, line 38, the used credit amount from memory 78 to bank account 52 or 54 of location 14 or 16 according to which sponsoring company honored the credit. Alternatively this could be done through paper billing procedures. When a participant makes a sale at location 14 using earned credit that has been posted by a third party credit issuer to his/her account for use at that location, but the actual cash value has not yet been transferred to a holding account, computer 30 may electronically transfer, through bus 26, I/O 32, line 38, the amount used by the sale, from the third party's bank account to the bank account of location 14. Alternatively this could also be done through paper billing procedures. Of course, each sponsoring company can specify what merchandise can not be purchased with such commission earnings or which can not be included in totaling award commissions. Such designation could be done by storing the merchandise upc codes in merchant accounts memory 80 or preferably in memory 30 and may be checked by computer 24 or 60 against the upc codes of each item of purchase at time of sale. Computer 24 or 60 would subsequently deduct item prices for those that are not allowed to be used in totaling commissions on any purchase, or block the issuance of award credit toward any item of purchase which is not allowed. According to a sponsoring company's requests, which may be stored in memory 80, but preferably memory 30, award issuance can also be realized by the printing of checks, coupons, or certificates by device 36, 50 and/or device 62 and sent to the participants, such as by mail. Award issuance through catalog merchandise selection and/or travel tour selection could also occur accordingly as award amount figures and/or orders could be sent to such vendors accordingly. Wire transfer to a participant's bank account 82, 84 through another communication line 38 may also occur from either sponsoring companies' bank accounts 52, 54 through lines 38, and I/O 46 or from memory 78 through bus 44, I/O 46 and lines 38. Additionally, wire transfer may occur under control of computer 24 through bus 26, I/O 32, line 38, accounts 52, 54 through a conventional communication line, such as a telephone line (not shown) to accounts 82, 84.

Using conventional-optical-character-recognition technology (not shown), enrollment processor 90, may automatically read information that may be supplied by participant's upon enrollment on the enrollment forms. This could alternatively be done manually, with the aid of an operator and enrollment processor 90 having keyboard input apparatus, or further, may be input at device 28. Once entered, the information may be stored in memory 79, but preferably in memory 30. Participant recruitment structure may be determined by the information on the forms and may be stored in memories 30, or 79. Although preferably determination will be done prior to inputting the entire enrollment form information. This could occur as a sponsoring company enters an applicant's sponsor's account number into device 28 upon first swipe of a new membership card and subsequent issuance of the card to the applicant. This input may then be output through bus 26, I/O 32, line 38 I/O 46, bus 44, and stored in memory 79 associating the newly issued card account number with the sponsor's account number while relating to that merchant. The information would preferably be transmitted through bus 26 and recorded similarly in memory 30.

Financial institution 92 through another communication line 38, and through I/O 46, line 38 may electronically transfer funds to accounts 52, 54. Alternatively this could be accomplished through direct connection of a conventional communication line (not shown), from institution 92 to accounts 52, or 54. This might occur should a participant 82 or 84 have a credit line approved for use by the financial institution with such status being stored in memory 79, or 30, or in the magnetic stripe of the plastic card, and should the participant make a purchase where the program awards used is less than the purchase total is. The participant could choose to pay the balance using the financial institution approved credit line. If so, computer 60 or 24, could verify the participant's proper status and authorize payment from the lending institution to the appropriate sponsoring company's bank account. The financial institution could then send to the participant, a bill or other means for collection as is customary with such lending procedures, or alternatively, center 12 may issue a bill to the participant.

More specifically, in a transaction where a center 12 is used, data received at I/O device 46 is sorted out by computer 60 under control of an operation program stored in memory 48. The account numbers and security codes are examined to locate and verify the participant account which relates to the sponsoring company account stored in memory and the sponsoring company account having the same numbers and codes. Once the proper account is found its contents are accessed, a commission structure associated with the account is examined and, in accordance, the participant's designated-sponsors' accounts are accessed. The purchase total (PT) is read as well as sorted into 2 subtotals, applicable award merchandise total (AAMT) and non-applicable award merchandise total (NAAMT) by verifying merchandise upc code information received, against upc codes that may have been supplied by the sponsoring company and stored in memory 80. The participant's return credit information stored in the appropriate account subdirectories, which include available return amounts used in calculating previous awards (UCPA), and return amounts not used in calculating previous awards (NUCPA), are also read and possibly temporarily stored in memory 48. AAMT is subtracted by UCPA and the difference is the award applicable figure (AAF) which may be temporarily stored in memory 48. This portion of the operational program secures that, as established by the sponsoring company, only designated merchandise as chosen by the sponsoring company is used in figuring awards, and that return credit used in calculating previously issued awards is not used again in calculating the current purchase awards.

Continuing with a transaction where center 12 is used, the participant's total commission balance (TCB) is then read from memory 79 and temporarily stored in memory 48 and a maximum commission available balance (MCAB) is determined and temporarily stored in memory 48 by comparing TCB with a usage limit established by the sponsoring company and stored in memory 80, and a participant's chronological-commission-use history, stored in memory 79. This portion of the operational program secures that, as established by the sponsoring company, a participant uses no more than the maximum-allowed-commission amount on the purchase.

Further continuing with a transaction where center 12 is used, the participant's account subdirectory information concerning chronological-point-accumulation is read and converted into a discount rate (DR) according to conversion tables stored in memory 80. The DR is temporarily stored in memory 48. If the AAF is equal to or greater than a minimum purchase amount (MPA) possibly stored in memory 80, the DR is multiplied by the AAF and the sum is a converted-point award (CPA). If CPA is greater than a maximum-allowed discount (MAD) also stored in memory, then CPA will be reduced so that it equals MAD. If AAF is less than MPA then CPA is set to zero. CPA is subtracted from AAF resulting in an award-applicable-point-applied balance (AAPAB) which is also temporarily stored in memory. This portion of the operational program secures that, applied to the purchase is an appropriate point discount, which is not greater than a maximum amount optionally established by the sponsoring company and which is only issued if the applicable merchandise purchase meets or exceeds a minimum amount also optionally established by the sponsoring company.

Further continuing with a transaction where center 12 is used, computer 60 then determines a commission-award allowable (CAA) for use with the purchase where such CAA does not exceed a maximum amount established by the sponsoring company. This is done by comparing MCAB with AAPAB as follows: if MCAB is greater than AAPAB then CAA=AAPAB, otherwise CAA=MCAB. Once determined, CAA may be sent to the display at device 36 where the participant can request how much of CAA to use. Commission used (CU) might be predetermined by a percentage figure stored in memories 30, 48, or 79 or overridden at input device 34 with each purchase. Once determined, CU is subtracted from AAPAB and the difference is the award-applicable-point-and-commission-applied balance (AAPCAB). AAPCAB is added to NAAMT and subtracted by NUCPA securing that any available return credit which was not used for previously issuing awards is appropriately deducted from the bill. The resulting figure is a balance due (BD). BD may be then sent to device 36 which the participant would pay as seen fit, such as by cash or check. Thus, the participant properly realizes the return credit, the frequent-purchase-discount award and the referral-commission award with each appropriate purchase. If the participant has a credit line approved by a financial institution and the available amount of credit is equal to or greater than the amount of BD, a request for payment of BD using such available credit may be sent to device 36. If such use is selected, the amount of BD will be deducted from the participant's available-extended-credit-line balance and a bill value will be created in the same amount. The bill value may be sent to the financial institution and the funds could be transferred to the merchant accordingly. As stated before, the financial institution can then bill the participant or have center 12 do the billing. If center 12 does the billing, the amount of BD can accumulate in an account stored in memory 79 and may accrue appropriate interest charges and, periodically, such as once a month, be read, causing a statement to be created at printer 62 in the amount of the accumulated totals; thereafter resetting BD to zero, or performing such accounting as is standard in accordance with the dates of receipt of payment, or other charges, or deductions that might apply. Collection may occur as printer 62 accesses the consumer's bank account automatically and transfer the funds to the lending institution, or alternatively, a statement may be sent to the consumer on behalf of the lending institution.

Further continuing with a transaction where center 12 is used, whatever discount, commission or return credit is used may be deducted from or stored chronologically in the participant's appropriate account subdirectories. The PT, AAF, AAPAB, or AAPCAB or any combination thereof may be used, in accordance with the sponsoring company's commission and conversion tables, to determine a point value, earned-commission value, donation value, raffle entry, or any combination thereof, and applied to appropriate holding account subdirectories of parent accounts, which may include participants, participant's sponsors, or program sponsors. Once the values and/or entries are applied, they may be decreased accordingly in the case of the participant's subsequent return of the purchase within the sponsoring company's cash back return date policy and/or graduated to available status, and stored in appropriate account subdirectories, if the purchase is not returned within the allotted time. Bill values stored in memory of bill printer 50 may be incremented in amounts equal to those derived from PT, AAF, AAPAB, or AAPCAB, or any combination thereof, in accordance with the sponsoring-company-commission-structure and may be deducted from the sponsoring company's bank account and stored in memory 30, 78 or 79 until such time as the amounts are depleted, in accordance with the program, by subsequent issuance to the sponsors who earned them.

Further continuing with a transaction where center 12 is used, computer 60 transfers, usually after the transaction at the sponsoring company location has completed, an amount equal to the CU, from memory 78 to the appropriate sponsoring company's bank account or sends a check to the merchant in the same amount or further allows that value to be deducted from a bill that the merchant might incur for use of the central control center's service. This allows for the amount of award being held in an account for the appropriate participant to be issued to the sponsoring company on behalf of that participant. Alternatively, an award-honored-payment-due balance can be created, incremented, reduced and stored in memory 42 in accordance with payment being possibly made from center 12 to the sponsoring company on a daily, weekly, monthly, or any other type of scheduled basis. Computer 60 might also instruct printer 62 to issue coupons checks or certificates on a certain or varied schedule which will allow deliverance of available credit to the appropriate participants. Further, computer 60 might instruct the transfer of funds and/or catalog and/or travel tour orders made by a participant to the appropriate vendors in order for the participant's award selection request to be fulfilled. All entries, donations, discounts and used credit may be accounted for in memory, 79, or 80 with itemized statements being created by printer 62 for deliverance to sponsoring companies, participants, or other third parties.

Access authorization unit 42 may allow access to account information by entering account and/or security numbers manually into a keyboard apparatus of unit 42, or through voice or tone over a phone line with the aid of additional provisions being incorporated into unit 42, such as voice, and tone detection technology. Output of the information including balances and other account information may be toggled through similarly and viewed through a computer screen or through a printout at printer 62, device 36, or displayed through device 36, or may be converted to voice data and transmitted through a phone line to a speaker. Although shown separately, where unit 42 is an access authorization unit, it could share the same memory as printer 50 and 62. Also, participant accounts memory 79 and sponsoring company account memory 80 are shown separately, but may be combined into one memory, and may even form part of memory 48 or access unit 42. Further, holding account memory 78 may also utilize memory 48. Preferably a center 12 would not be used, in which case, memory 36, and/or device 28 would perform the tasks assigned to memory 48 and unit 42, and computer 24 and memory 30 would perform the tasks assigned to computer 60 and the memories of center 12, while award output device 36 performs the functions of printers 50 and 62.

Data from each sponsoring company location 14, 16 may be transmitted to center 12 concurrent with the point-of-sale transaction, or preferably, memory 30 may store the data associated with one or more such transactions accordingly. The sorted data may also be sent to center 12, to at least a second sponsoring company memory 30, or to a plastic card at another time. When using a center 12, storing data in memory 30, and sending it to center 12 at a later time, may be preferred so as not to unduly tie-up telephone lines or to take advantage of lower nighttime telephone rates, for example. Further, subsequent transmission may be under control of center 12 and, thus, occur at a time or times most appropriate for center 12 to spread out its tasks over a period of time. Data from location 14, or 16 may be processed entirely at location 14, or 16 irrespective of the need for a center 12, as the apparatus instilled at each sponsoring company location can perform the tasks necessary. Preferably, in the case where no center 12 is used and where a participant is a member with several sponsoring company locations that collaborate award amounts, information may be sent to and stored in the magnetic stripe or similar on the participant's plastic card and each balance updating may occur separately as the participant uses the card at each location. This would create an additional incentive for having the participants return to the sponsoring company location.

Each merchant may have several points-of sale each equipped with participant and performance data input devices 28, 34. Memory 30, outputs 26 and I/O device 26 for each merchant location may be replicated at each point-of-sale. Preferably, however, only input devices 28, 34 are so-replicated for any merchant, such that only one computer 24 associated with that merchant location is necessary. Furthermore, should a sponsoring company wish to use a coupon validation network such as that invented by Humble, U.S. Pat. No. 4,949,256 issued Aug. 14, 1990, computer 60 or 24 can access the coupon validation network and allow processing to commence accordingly. Additionally, should a financial institution wish to award participants for making sales using the financial institution's extended credit line at any locations, computer 60 or 24 could also determine such award figures by comparing a financial institution's award table, which may be stored in memory 48 or 30, with appropriate BD amounts extended accordingly. Likewise, financial institution award figures can be controlled by computer 60 or 30 in that they can be redeemed similarly, as shown above, at only certain locations, at any location, or at a single location; issued immediately by way of direct deposit into participant's bank accounts; or redeemed in such conventional manners (not shown) only on certain merchandise or services, or in cash, such as at an automated cash dispensing machine or similar, or used to reduce the balance of the participant's financial-institution-statement balance, or issued to participants periodically by way of check, coupon, certificate, or any combination thereof.

CONCLUSION, RAMIFICATIONS AND SCOPE

By virtue of the foregoing there is thus provided a system wherein a participant with one card can realize multi-level credit and/or awards with multiple sponsoring companies accordingly and which allows sponsoring companies to greater motivate their participants referral efforts and inspire their participants loyalty, while allowing individuals to participate without the need for approval of a charge card so as to earn unlimited savings and conveniently keep track of their return balances. Each sponsoring company can optionally designate, irrespective of how a participant pays for the transaction such as whether by cash, check, or credit card and irrespective of any other sponsoring company's and/or central control's choices, award commission level structures and percentages, point conversion discount tables, raffle entry guidelines and associated awards. Similarly sponsoring companies can designate donations being made to whom, by whom and how, along with minimum and/or maximum purchase guidelines for award redemption, and minimum and/or maximum award crediting per purchase and/or time periods. Further they can designate what merchandise and/or service is award redeemable and/or award creditable, while requiring no additional cash outlay for the sponsoring company upon participant redemption, Further yet, they can designate exactly with whom the award they issue to participants can be redeemed with, whether the award is paid in cash, check, coupon, certificate, merchandise, service or transferred directly to a participant's bank account or any combination thereof. Additionally, sponsoring companies may collaborate with other sponsoring companies without realizing any financial losses when honoring awards issued to participants by such "other sponsoring companies."

Further, there is provided a program which has widespread availability to merchants of all financial statures since financial institution sponsorship is not required and since an individual would not run out of room in his/her wallet or have a limited budget persuading him/her not to participate in multiple programs, since only one card or account number is needed and since credit accumulation can occur without the individual having to make a purchase. The program allows a merchant to also use the coupon validation network invented by Humble, U.S. Pat. No. 4,949,256 issued Aug. 14, 1990 in conjunction, whereas the participants can have the same account number which is used to access the coupon network, assigned to the same number which is used for every other portion of this invention. The program also provides a convenient and efficient multi-level selling structure to merchants without requiring them to have a broad knowledge of multi-level marketing, easily shipped or stored products for sale, catalogs printed, and goods or services being sold to individuals only through catalogs with such merchandise requiring shipping. The program also eliminates participants being limited to shopping through a catalog. Merchants do not need to hire extra employees or acquire substantially priced computer equipment to use the program, nor do they need to gain approval of their goods or services in with other multi-level-selling-type-companies' catalogs. Merchants can utilize the multi-level selling structure conveniently and efficiently, which can take the place of other advertising, thus allowing more time and money to be spent toward improved product performance, enhanced employee production or other similar business relations, with less time and money being spent on promotions.

Additionally, there is provided a program which has greater appeal to financial institution sponsorship for reasons such as: a line of credit can be issued to just one card which can represent a participant as a member with multiple sponsoring company incentive programs, the participant would be more inclined to participate with multiple programs since their wallet won't overflow with cards and their budget doesn't prohibit them from earning awards, participants would be more inclined to use their card when making sales since their awards and/or return credits can be redeemed when making such sales and since many times, the award and/or return credit issued, being less than the sale total, would encourage payment of the balance using the credit line offered on the same card by the lending institution. Furthermore, the financial institution can sponsor multiple sponsoring company programs without having to issue multiple lines of credit, multiple cards and multiple statements to an individual who participates in the lot. This program also allows the financial institution to encourage greater individual use of their extended credit at a wider array of purchase locations. The financial institution can also allow award issuance for use of their extended credit on purchases, such awards being redeemable on certain merchandise or services, at any location, at certain locations, or at a single location, or in cash, such as at an automated cash dispensing machine or similar, or used to reduce the balance of the participant's financial-institution-statement balance, or issued to participants periodically by way of check, coupon, certificate travel tours, catalog merchandise or issued immediately, by way of direct deposit into participant's bank accounts, or any combination thereof.

By receiving a statement from the central control center, or a display or printout from a sponsoring company or by placing a phone call to an account information hotline, there is also provided a convenient method for allowing participants to discover their current balances for any sponsoring company they are a member with. Additionally, telecommunication companies can sponsor the program by encoding calling card numbers on the participant's membership card which may be bought by participants and used to make calls in an amount equal to the purchase price of the card, or for a greater amount of the price of the card, or, if depleted, the amount available can be replenished with additional time purchases so that the card may be reused.

While the present invention has been illustrated by description of an embodiment and while the illustrative embodiment has been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A computer assisted system for a multilevel incentive program for at least one program sponsoring company having individual program participants, comprising: at least:
   (a) a computer data storage memory having at least data storage areas for storing computer data, wherein at least one of the storage areas comprises a software program for at least determining that a selection of the storage areas are associated with an identifier, said identifier being associated with at least one of the participants;
   (b) a computer data entry device for registering at least performance data associated with the associated participant, wherein said performance data comprises at least said identifier;
   (c) a computer data processing device at least having means for communicating with both the storage memory and the entry device and automatically applying at least the software program with said performance data to determine resulting award information to store in the selection of storage areas associated with said identifier;
   (d) a conveying means for communicating at least the award information appearing in at least one of the selection of storage areas associated with said identifier so as to be received by at least one of the participants who is other than the associated participant, thereby allowing participants other than the associated participant to be rewarded based on performance by the associated participant;
   (e) a receiving means for receiving the award information appearing in at least one the selection of storage areas associated with said identifier so as to be received by at least one of the participants who is other than the associated participant, wherein the communicated award information is being issued in association with the respective sponsoring company, whereby set forth is a convenient referral recognition system, particularly for use by any of various types of merchants heretofore impeded from competing on a multilevel playing field.

2. The system of claim 1 wherein said software program is arranged such that said selection of the storage areas are predesignated and such predesignated selection is stored in at least one of the storage areas, wherein subsequent communications of the same performance data to the processing device will produce additional results in the same storage areas.

3. The system of claim 1 wherein said computer data entry device determines said identifier irrespective of how the associated participant pays for a purchase.

4. The system of claim 1 wherein said receiving means is arranged to receive the communicated award information wherein the sponsoring company is not the type of company wherein at least a majority of their business comprises providing customers with end products that said customers order primarily through their catalog, wherein said end products reach said customers' residences from a merchandise supply center primarily by way of at least a person carried type delivery, wherein the person making the delivery is typically not one of the customers, whereby said computer assisted system sets forth a program where customers can readily walk into a local retailer's store and receive multilevel awards thus giving the local retailer a means to compete on a heretofore restricted playing field.

5. The system of claim 4 wherein said receiving means is arranged to receive the communicated award information, wherein the sponsoring company is other than a telecommunication type business.

6. The system of claim 1 wherein said receiving means is arranged to receive the communicated award information, wherein the sponsoring company is other than a telecommunication type business.

7. The system of claim 1 wherein said individual program participants do not need to carry more than one number to participate in varied sponsoring company programs as their one number, when entered into the entry device having a unique number stored in its memory, form a code by way of an entry device software program, thus determining said identifier, thereby allowing access to the appropriate storage areas which may include separate sponsoring company rules.

8. The system of claim 1 wherein said receiving means is located at the sponsoring company's place of business.

9. In a system for an incentive program for at least one program sponsoring company having individual program participants, wherein said system incorporates multilevel marketing and wherein the use of such a system has been limited to a certain type of business wherein said certain type of business is the type of company wherein at least a majority of their business comprises providing customers with end products that said customers order primarily through their catalog, wherein said end products reach said customers' residences from a merchandise supply center primarily by way of at least a person carried type delivery, wherein the person making the delivery is typically other than the customer, improvements comprising: in a predetermined location arrangement at least:
   (a) a computer data storage memory having at least data storage areas for storing computer data, wherein at least one of the storage areas comprises a software program for at least determining that a selection of the storage areas is associated with an identifier associated with at least one of the participants;
   (b) a computer data entry device for registering at least performance data associated with the associated participant, wherein said performance data comprises at least said identifier which is determined irrespective of how the identified participant pays for a purchase;
   (c) a computer data processing device at least having means for communicating with both the storage memory and the entry device and automatically applying at least the software program with said performance data to determine resulting award information to store in the selection of storage areas associated with said identifier;
   (d) a conveying means for communicating at least the award information appearing in at least one of the selection of the storage areas associated with said identifier so as to be received by at least one of the participants who is other than the associated participant;
   (e) a receiving means for receiving the award information appearing in at least one of the selection of the storage areas associated with said identifier so as to be received by at least one of the participants who is other than the associated participant, wherein the communicated award information is being issued in association with the respective sponsoring company and wherein the respective sponsoring company is other than the limited type, thereby providing an improved program any of various types of merchants heretofore impeded from competing on a multilevel playing field.

10. The improved system of claim 9 wherein said software program is arranged such that said selection of the storage areas is predesignated and such predesignated selection is stored in at least one of the storage areas, wherein subsequent communications of the same performance data to the processing device will produce additional results in the same storage areas, unless a computer data conversion table appearing in at least one of the storage areas provides otherwise.

11. The improved system of claim 9 wherein said receiving means is arranged to receive the communicated award information wherein the sponsoring company is other than a telecommunication type business.

12. The improved system of claim 9 wherein said individual program participants do not need to carry more than one number to participate in varied sponsoring company programs as their one number, when entered into the entry device having a unique number stored in its memory, form a code by way of an entry device software program, thus determining said identifier, thereby allowing access to appropriate storage areas which may include separate sponsoring company rules.

13. The improved system of claim 9 wherein said receiving means is located at the sponsoring company's place of business.

14. In a system for a credit card type incentive program wherein individual program participants having credit approval can earn awards based on their own respective purchases, improvements comprising: at least:

(a) a computer data storage memory having at least data storage areas for storing computer data, wherein at least one of the storage areas comprises a software program for at least determining that at least one of the storage areas is associated with an identifier associated with at least a first participant, and wherein the associated storage area is assigned to at least a second participant;

(b) a computer data entry device for registering at least performance data associated with said first participant, wherein said performance data comprises at least said identifier;

(c) a computer data processing device at least having means for communicating with both the storage memory and the entry device and automatically applying at least the software program with said performance data to determine resulting award information to store in at least the storage area associated with said identifier and assigned to said second participant;

(d) a conveying means for communicating at least the award information appearing in at least the storage area associated with said identifier and assigned to said second participant so as to be received by at least said second participant;

(e) a receiving means for receiving the award information appearing in at least the storage area associated with said identifier and assigned to said second participant so as to be received by at least said second participant wherein the communicated award information is being issued in association with at least a program sponsoring company, thereby allowing multilevel awards to be issued to a customer's credit card based on another customers' credit card purchases.

15. The improved system of claim 14 wherein said receiving means will not accept the communicated award if said receiving location is excluded by the sponsoring company and wherein if the receiving means is not excluded then the receiving means can electronically opt at the point of redemption for a part of the communicated award information to withhold for a later purpose based on an input into an input means for receiving such input and communicating such input to the processing device, wherein said input means is part of said receiving means.

16. The improved system of claim 14 wherein said software program is arranged such that the storage area associated with said identifier and assigned to said second participant is predesignated as such and such predesignated association assignment is stored in at least one of the storage areas, wherein subsequent communications of the same performance data to the processing device will produce additional results in the same storage area.

17. The improved system of claim 14 wherein said receiving means is arranged to receive the communicated award information wherein the sponsoring company is not the type of company wherein at least a majority of their business comprises providing customers with end products that said customers order primarily through their catalog, wherein said end products reach said customers' residences from a merchandise supply center primarily by way of at least a person carried type delivery, wherein the person making the delivery is typically not the customer, whereby the improvement provides a program where customers can readily walk into a local retailer's store and receive multilevel awards thus giving the local retailer a means to compete on a heretofore restricted playing field.

18. The improved system of claim 17 wherein said receiving means is arranged to receive the communicated award information wherein the sponsoring company is other than a telecommunication type business.

19. The improved system of claim 14 wherein said receiving means is arranged to receive the communicated award information wherein the sponsoring company is other than a telecommunication type business.

20. The improved system of claim 14 wherein said individual program participants do not need to carry more than one number to participate in varied sponsoring company programs as their one number, when entered into the entry device having a unique number stored in its memory, form a code by way of an entry device software program, thus determining said identifier, thereby allowing access to the corresponding storage areas which may include separate sponsoring company rules.

* * * * *